(12) United States Patent
Huang et al.

(10) Patent No.: US 12,377,578 B2
(45) Date of Patent: Aug. 5, 2025

(54) MONOCRYSTALLINE SILICON MICRO-NANO DUAL-SCALE ANTI-REFLECTION TEXTURE AND PREPARATION METHOD THEREFOR

(71) Applicants: SHANDONG UNIVERSITY, Shandong (CN); YANSHAN UNIVERSITY, Hebei (CN)

(72) Inventors: Chuanzhen Huang, Qinhuangdao (CN); Xuefei Liu, Jinan (CN); Hanlian Liu, Jinan (CN); Peng Yao, Jinan (CN); Hongtao Zhu, Jinan (CN); Bin Zou, Jinan (CN); Dun Liu, Jinan (CN); Jun Wang, Jinan (CN); Zhen Wang, Qinhuangdao (CN); Longhua Xu, Qinhuangdao (CN); Shuiquan Huang, Qinhuangdao (CN)

(73) Assignees: SHANDONG UNIVERSITY, Jinan (CN); YANSHAN UNIVERSITY, Qinhuangdao (CN)

( * ) Notice: Subject to any disclaimer, the term of this patent is extended or adjusted under 35 U.S.C. 154(b) by 497 days.

(21) Appl. No.: 17/941,726

(22) Filed: Sep. 9, 2022

(65) Prior Publication Data
US 2023/0405874 A1 Dec. 21, 2023

(30) Foreign Application Priority Data
Jun. 20, 2022 (CN) .......................... 202210697039.8

(51) Int. Cl.
*B28D 5/04* (2006.01)
*B23K 26/0622* (2014.01)
(Continued)

(52) U.S. Cl.
CPC ............ *B28D 5/04* (2013.01); *B23K 26/0624* (2015.10); *G02B 1/113* (2013.01); *G02B 1/118* (2013.01); *B23K 2103/56* (2018.08)

(58) Field of Classification Search
CPC .... H10F 71/129; H10F 77/703; H10F 77/315; B28D 5/04; G02B 1/113; G02B 1/118;
(Continued)

(56) References Cited

U.S. PATENT DOCUMENTS

| 2011/0036984 A1* | 2/2011 | Zhang | ..................... G02B 1/118 250/340 |
| 2014/0061531 A1* | 3/2014 | Faur | ........................ H10F 10/14 252/79.3 |

(Continued)

*Primary Examiner* — Brook Kebede
(74) *Attorney, Agent, or Firm* — Oliff PLC

(57) ABSTRACT

A monocrystalline silicon micro-nano dual-scale anti-reflection texture and a preparation method therefor. The preparation method combines nanosecond-laser-assisted waterjet near-damage-free processing and femtosecond laser scanning, and subsurface damage caused by a re-cast layer phenomenon and a hot crack in a monocrystalline silicon laser texturing process can be effectively reduced by combining a nanosecond-laser-assisted waterjet near-damage-free processing technology and an ultra-short pulse femtosecond laser cold processing technology; and meanwhile, a micro-scale frame structure and a nano-scale structure can be flexibly modified respectively by adjusting nanosecond-laser-assisted waterjet technological parameters and femtosecond laser technological parameters, a geometry light trapping effect and an effective dielectric effect can be achieved in a micro-nano dual-scale hybrid structure at the same time, and surface reflection is reduced.

10 Claims, 2 Drawing Sheets

(51) Int. Cl.
*G02B 1/113* (2015.01)
*G02B 1/118* (2015.01)
*B23K 103/00* (2006.01)

(58) Field of Classification Search
CPC . B23K 26/0624; B23K 26/362; B23K 26/364
See application file for complete search history.

(56) References Cited

U.S. PATENT DOCUMENTS

2016/0054478 A1* 2/2016 Otani ................. C08F 290/062
  428/141
2017/0358694 A1* 12/2017 Juntunen ............... H10F 71/121
2018/0136370 A1* 5/2018 Busse ....................... H01S 1/06

* cited by examiner

MONOCRYSTALLINE SILICON MICRO-NANO DUAL-SCALE ANTI-REFLECTION TEXTURE AND PREPARATION METHOD THEREFOR

TECHNICAL FIELD

The present disclosure belongs to the technical field of laser microfabrication, and particularly relates to a monocrystalline silicon micro-nano dual-scale anti-reflection texture and a preparation method therefor. The preparation method specifically adopts a manner of combining laser-assisted waterjet and a femtosecond laser technology for preparation.

BACKGROUND

Descriptions herein only provide background techniques related to the present disclosure, and do not necessarily constitute the related art.

Monocrystalline silicon is one of most important materials applied to silicon-based solar cells and photoelectric detectors, and in these applications, high reflection of an air-silicon interface can hinder effective light collection and greatly influence performance. However, the optical properties of the surface can be controlled by the micro-nano structure texture and the reflectivity of monocrystalline silicon surface can be reduced. For example, when a surface structure is in a micro-scale larger than incident light wavelength, incident light can be reflected several times in structure gaps so that a material can absorb most of incident light to form a light trapping effect, as shown in FIG. 1; and when a period of the structure is in a nano scale (named as a sub-wavelength structure) less than the incident light wavelength, along with gradual increasing of an equivalent gradient refractive index of a coarse structure layer, an anti-reflection effect similar to a multi-layer gradient medium film is generated, namely an effective medium effect, and then reflection of the incident light can be restrained to a great degree, shown in FIG. 2.

Methods for preparing anti-reflection textures include wet chemical etching, nanoimprint lithography, electron beam etching, plasma etching or the like. But, due to complex preparation technologies or chemical reagent usage in these methods, these methods have some disadvantages such as high cost or environment pollution. A laser processing technology is flexible and controllable in processing structure so that procedural and large-area processing can be achieved, and also has the advantage of environment friendliness. However, after laser etching, there will be serious damage such as a re-cast layer, a heat-affected zone, a chemical etching method is usually needed to remove the processing damage, thereby the technological process and cost are increased, and environment pollution is caused due to usage of a chemical reagent. Because of the ultrashort pulses, femtosecond laser can realize "cold processing" of materials, so the heat affected zone is small, but the material removal efficiency of femtosecond laser is low.

SUMMARY

The present disclosure aims to solve the serious processing damage of the surface recasting layer and hot cracks of the traditional nanosecond laser texturing and the low removal efficiency of femtosecond laser, and provides a monocrystalline silicon micro-nano dual-scale anti-reflection texture and a preparation method therefor. The preparation method combines nanosecond-laser-assisted waterjet near-damage-free processing technology and an ultra-short pulse femtosecond laser cold processing technology, and subsurface damage caused by a re-cast layer and the hot crack in monocrystalline silicon laser texturing process can be effectively reduced; and meanwhile, a micro-scale frame structure and a nano-scale structure can be flexibly modified respectively by adjusting nanosecond-laser-assisted waterjet process parameters and femtosecond laser process parameters, a geometry light trapping effect and an effective medium effect can be achieved in a micro-nano dual-scale hybrid structure at the same time, and surface reflection is reduced.

In order to realize the above objectives, the present disclosure is implemented by means of the following technical solutions:

on one hand, the present disclosure provides a method for preparing a monocrystalline silicon micro-nano dual-scale anti-reflection texture, including:

a nanosecond-laser-assisted waterjet device is utilized for scanning in a longitudinal direction of a monocrystalline silicon wafer and waterjet is arranged behind nanosecond lasers in a scanning speed direction to prepare a V-shaped groove array in the monocrystalline silicon wafer; and nano structures different in size or density are processed on the V-shaped groove array by utilizing femtosecond lasers in different focal positions for sequential scanning in a transverse direction perpendicular to the V-shaped groove array or forming a set angle with the V-shaped groove array, thereby obtaining the micro-nano dual-scale anti-reflection texture.

On the other hand, the monocrystalline silicon micro-nano dual-scale anti-reflection texture provided by the present disclosure is prepared by the preparation method.

Beneficial effects of one or more embodiments of the present disclosure are as follows:

the waterjet is arranged behind the nanosecond lasers in the scanning speed direction, and after being heated and softened by the nanosecond lasers in a to-be-processed area, a monocrystalline silicon material is sheared and removed by the waterjet in a plasticity mode so that subsurface damage caused by the re-cast layer and the hot crack is greatly reduced, and the surface of the monocrystalline silicon is etched in a near-damage-free state, with the advantages of low processing damage, small re-cast layer and small heat-affected zone.

When the femtosecond lasers are used for scanning in the transverse direction perpendicular to the V-shaped groove array direction nearby an ablation threshold, laser intensity of the femtosecond lasers irradiating to a surface of a V-shaped groove structure can be changed in a gradient manner along with irradiation height, so that energy density of the femtosecond lasers is changed in a gradient manner nearby the ablation threshold, thereby respectively inducing sub-wavelength structures such as a fine ripple periodic structure, a coarse ripple periodic structure, a nano particle in different positions, then, the geometry light trapping effect and the effective dielectric effect can be achieved in one micro-nano dual-scale hybrid structure at the same time, and surface reflection is reduced.

BRIEF DESCRIPTION OF THE DRAWINGS

The accompanying drawings constituting a part of the present disclosure are used to provide a further understanding of the present disclosure. The exemplary embodiments of the present disclosure and descriptions thereof are used to explain the present disclosure, and do not constitute an improper limitation of the present disclosure.

DETAILED DESCRIPTION

Figure 1:
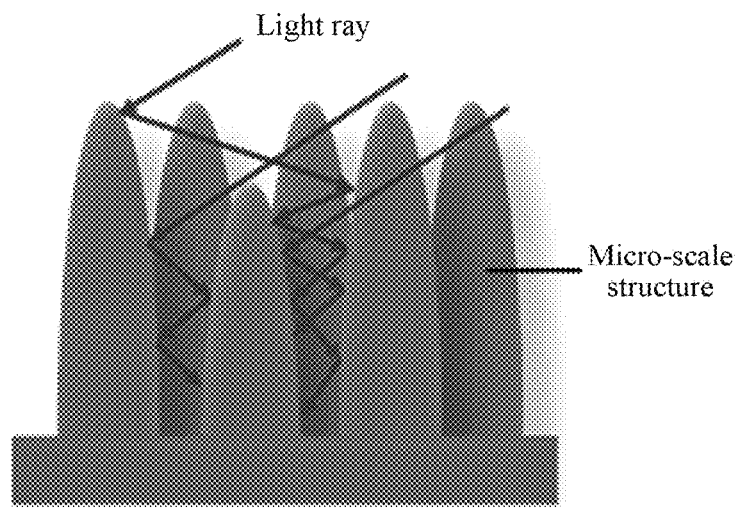
FIG. 1 is a light trapping effect formed through multi-time reflection of light rays in a micro-scale structure.
Figure 2:
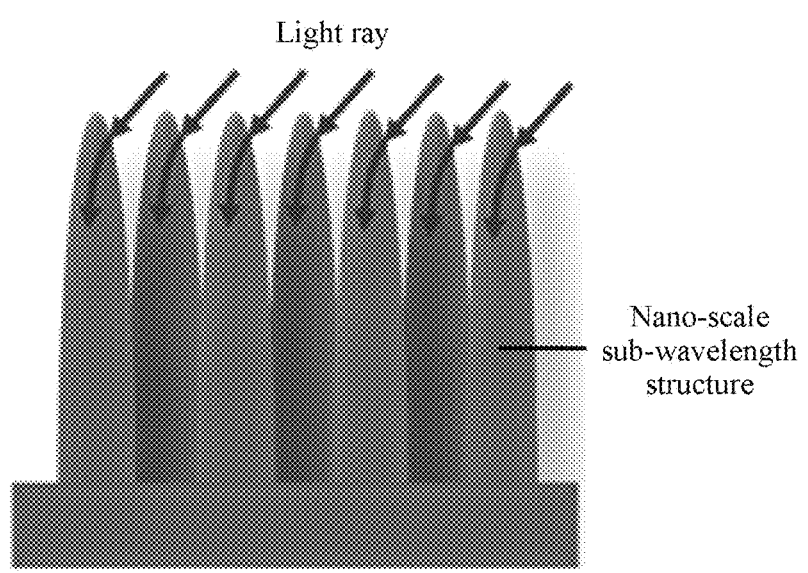
FIG. 2 is an effective medium effect generated in a nano-scale sub-wavelength structure of the light rays.

It should be pointed out that the following detailed descriptions are all illustrative and are intended to provide further descriptions of the present disclosure. Unless otherwise specified, all technical and scientific terms used in the present disclosure have the same meanings as those usually understood by a person of ordinary skill in the art to which the present disclosure belongs.

on one hand, the present disclosure provides a method for preparing a monocrystalline silicon micro-nano dual-scale anti-reflection texture, including:

a nanosecond-laser-assisted waterjet device is utilized for scanning in a longitudinal direction of a monocrystalline silicon wafer and waterjet is arranged behind nanosecond lasers in a scanning speed direction to prepare a V-shaped groove array in the monocrystalline silicon wafer; and nano structures different in size or density are processed on the V-shaped groove array by utilizing femtosecond lasers in different focal positions for sequential scanning in a transverse direction perpendicular to the V-shaped groove array or forming a set angle with the V-shaped groove array, thereby obtaining the micro-nano dual-scale anti-reflection texture.

In some embodiments, a pulse width of nanosecond lasers is 10-350 ns, pulse repetition frequency is 20-1000 kHz, a scanning speed is 1-5 mm/s, and pressure intensity of waterjet is 5-20 MPa.

Preferably, the wavelength of the nanosecond lasers is 1064 nm.

Preferably, laser pulse energy is 0-0.6 mJ, focus hight is −0.6-0.6 mm, a waterjet nozzle standoff distance is 0.2-1.2 mm, an offset distance of the waterjet is 0.1-0.8 mm, and a waterjet impact angle ranges from 30 degrees to 60 degrees.

V-shaped groove arrays different in size and interval can be obtained by selecting different process parameters. In some embodiments, laser pulse energy of femtosecond lasers is 1-13 mJ, a scanning speed is 25-300 μm/s, and pulse repetition frequency is 1-1000 Hz.

Preferably, the wavelength of the femtosecond lasers is 800 nm, and a laser pulse width is 35 fs.

Preferably, focal planes of the femtosecond lasers are positioned to middles of V-shaped grooves.

Researches show that nearby or below an ablation threshold, sub-wavelength structures such as a fine ripple periodic structure, a coarse ripple periodic structure, a nano particle can be respectively generated on a surface of monocrystalline silicon through induction along with increasing of energy density of the femtosecond lasers. The present disclosure performs processing nearby femtosecond laser ablation threshold laser intensity and the positions of the focal planes are positioned to the middles of the V-shaped grooves in a height direction, thereby obtaining the laser intensity gradually reduced upwards or downwards along the middles of the V-shaped grooves in the height direction.

In some embodiments, a depth of the V-shaped grooves is 20-40 μm, and a width is 20-40 μm. After irradiating into a V-shaped groove structure, light rays can be reflected and absorbed many times in the V-shaped grooves to form a light trapping effect and achieve a certain anti-reflection effect. Particularly, a nanosecond-laser-assisted waterjet technology removes a monocrystalline silicon material heated and softened by nanosecond lasers under an impact action of waterjet and has advantages of low processing damage, small re-cast layer and small heat-affected zone.

Preferably, a nano structure is a fine ripple periodic structure, a coarse ripple periodic structure or/and a nano particle.

On the other hand, the monocrystalline silicon micro-nano dual-scale anti-reflection texture provided by the present disclosure is prepared by the preparation method.

When the femtosecond lasers are adopted for performing transverse scanning on the surface of the V-shaped groove array, the focus hight of the femtosecond lasers change along with the V-shaped groove structure. Distribution of laser intensity of a Gaussian beam in a radial direction r and a propagation direction z is shown as formulas (1) and (2).

$$I(z, r) = \frac{2P}{\pi \omega^2(z)} \exp\left(\frac{-2r^2}{\omega^2(z)}\right) \quad (1)$$

$$\omega(z) = \omega_0 \sqrt{1 + \left(\frac{\lambda z}{\pi \omega_0^2}\right)^2} \quad (2)$$

Where, I is laser intensity, z is a length away from a laser beam waist in a beam propagation direction, r is a length away from a center of a light spot in a radial direction, P is a laser power, and λ is wavelength.

It can be known from the formula (1) that the laser intensity is maximum at the center of the laser light spot at the beam waist (namely, z=0 and r=0).

When r=0, $$I(z) = \frac{2\pi \omega_0^2 P}{\pi^2 \omega_0^4 + \lambda^2 z^2}. \quad (3)$$

It can be seen from the formula (3) that in the femtosecond laser scanning process, the laser intensity I (z) is gradually reduced along with increasing of |z| nearby a laser focal point.

Researches show that nearby or below an ablation threshold, sub-wavelength structures such as a fine ripple periodic structure, a coarse ripple periodic structure, a nano particle can be respectively generated on a surface of monocrystalline silicon through induction along with increasing of energy density of the femtosecond lasers. The present disclosure performs processing nearby femtosecond laser ablation threshold laser intensity and the positions of the focal planes are positioned to the middles of the V-shaped grooves in a height direction, thereby obtaining the laser intensity gradually reduced upwards or downwards along the middles of the V-shaped grooves in the height direction.

The ablation threshold is deduced through a function relationship between an ablation diameter and laser power via a method for measuring a laser ablation diameter, shown in a formula (4).

$$D^2 = 2\omega_0^2 \ln P - 2\omega_0^2 \ln P_{th} \quad (4)$$

Where, D is the ablation diameter, $\omega_0$ is a laser beam waist radius, P is laser power, and $P_{th}$ is ablation threshold power.

In the formula (4), $\omega_0$ is the light spot diameter measured when edge energy distribution of a laser beam is reduced to $1/e^2$, which is inherent attribute of the lasers, the ablation threshold power $P_{th}$ is inherent attribute of the material, and therefore the ablation diameter D in the formula (4) is a linear function of lnP. Material ablation is performed by using different laser powers P, ablation diameters D corresponding to different powers are recorded, linear fitting is adopted for obtaining a corresponding relation between D and lnP, and accordingly, the ablation threshold power $P_{th}$ and beam waist radius $\omega_0$ of the material can be obtained through calculation.

Laser intensity $I_{th}$ corresponding to the ablation threshold power $P_{th}$ can be shown in a formula (5).

$$I_{th} = \frac{2P_{th}}{\pi \omega_0^2} \quad (5)$$

When the femtosecond lasers are used for performing scanning in the transverse direction perpendicular to the V-shaped groove array direction nearby an ablation threshold, laser intensity of the femtosecond lasers irradiating to a surface of the V-shaped groove structure can be changed in a gradient along with irradiation height, so that energy density of the femtosecond lasers is changed in a gradient nearby the ablation threshold, thereby respectively inducing sub-wavelength structures such as a fine ripple periodic structure, a coarse ripple periodic structure, a nano particle in different positions, which are shown in FIG. 3(g).

In the femtosecond laser processing process, adjustable process parameters include laser pulse energy (0-13 mJ), a scanning speed (25-300 μm/s), pulse repetition frequency (0-1000 Hz), scanning frequency, a scanning interval and the like, and nano structures different in size and density can be obtained on the surface of the V-shaped groove structure by adjusting the femtosecond laser process parameters and the scanning path, thereby obtaining the micro-nano dual-scale anti-reflection texture.

The present disclosure is further described below with reference to the accompanying drawings and the embodiments.

Embodiment 1

Figure 3:
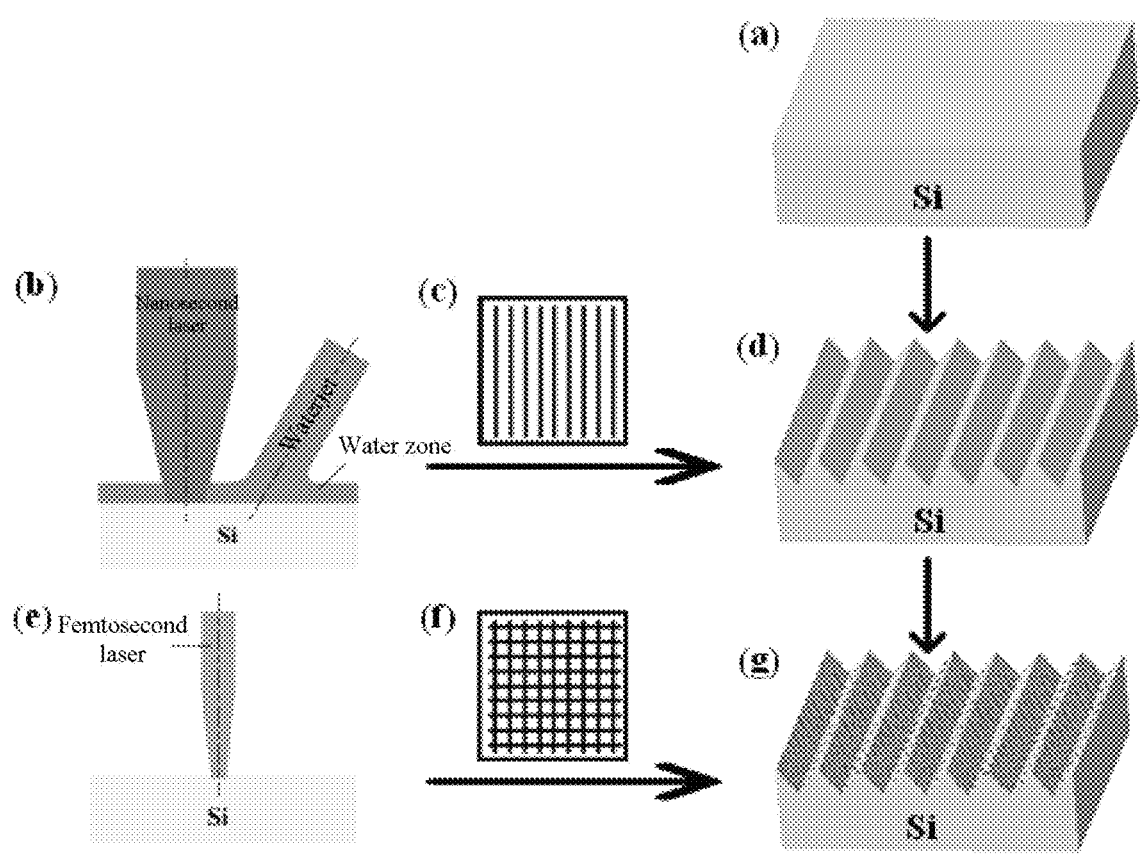
FIG. 3 is a process flow schematic diagram of combination of laser-assisted waterjet and femtosecond lasers to prepare a micro-nano dual-scale anti-reflection texture in this embodiment of the present disclosure, where (a) is a to-be-processed monocrystalline silicon wafer, (b) is a laser-assisted waterjet processing schematic diagram, (c) is a laser-assisted waterjet scanning path diagram, (d) is a V-shaped groove array prepared through laser-assisted waterjet, (e) is a femtosecond laser processing schematic diagram, (f) is a femtosecond laser scanning path (orthogonality is taken as an example on a basis of a nanosecond-laser-assisted waterjet scanning path), and (g) is a micro-nano dual-scale micro structure prepared after femtosecond laser processing.

As shown in FIG. 3, a method for preparing a monocrystalline silicon micro-nano dual-scale anti-reflection texture includes: 1) A micro-scale V-shaped groove array is processed through nanosecond-laser-assisted waterjet, where a technology adopts nanosecond lasers with a wavelength being 1064 nm, a laser pulse width being 100 ns, and repetition frequency being 144 kHz, (1) a monocrystalline silicon wafer is cleaned and installed on a nanosecond-laser-assisted waterjet workbench;

(2) focus hight of the lasers is adjusted to be 0 mm, a waterjet nozzle standoff distance is adjusted to be 0.4 mm, a waterjet impact angle is adjusted to be 42 degrees, and a waterjet offset distance is adjusted to be 0.5 mm;

(3) the laser pulse width is set to be 100 ns, pulse repetition frequency is set to be 144 kHz, laser pulse energy is set to be 0.104 mJ, a scanning speed is set to be 1 mm/s, and a scanning interval is set to be 32 μm;

(4) waterjet pressure intensity is adjusted to be 8 MPa; and (5) a scanning trace file is compiled according to scanning frequency and a scanning path, and processing programs are operated to perform processing of the micro-scale V-shaped groove array, where a depth of V-shaped grooves is 30-40 μm, and a width is 30-40 μm.

2) Femtosecond lasers are utilized for scanning to prepare a micro-nano dual-scale composite structure on a basis of the micro-scale V-shaped groove array, where the technology adopts femtosecond lasers with the wavelength being 800 nm, the femtosecond lasers are a Gaussian beam, a laser pulse width is 35 fs, pulse repetition frequency can be adjusted to maximum 1 kHz, and a scanning speed is 300 μm/s, (1) the monocrystalline silicon wafer is cleaned and installed on the workbench;

(2) laser pulse energy is set to be 0.2 mJ, pulse repetition frequency is set to be 1 kHz, a scanning speed is set to be 300 μm/s, scanning time is 1, and a scanning path is set, where the scanning path is perpendicular to the direction of the V-shaped groove array; and (3) focus hight of the lasers is adjusted to the middle of V-shaped grooves in a height direction, and the processing programs are operated for scanning to obtain the texture.

Embodiment 2

As shown in FIG. 3, a method for preparing a monocrystalline silicon micro-nano dual-scale anti-reflection texture includes: 1) A micro-scale V-shaped groove array is processed through nanosecond-laser-assisted waterjet, where a technology adopts nanosecond lasers with a wavelength being 1064 nm, a laser pulse width being 350 ns, and repetition frequency being 100 kHz, (1) a monocrystalline silicon wafer is cleaned and installed on a nanosecond-laser-assisted waterjet workbench;

(2) focus hight of the lasers is adjusted to be 0.3 mm, a waterjet nozzle standoff distance is adjusted to be 0.6 mm, a waterjet impact angle is adjusted to be 48 degrees, and a waterjet offset distance is adjusted to be 0.5 mm;

(3) the laser pulse width is set to be 10 ns, pulse repetition frequency is set to be 1000 kHz, laser pulse energy is set to be 0.015 mJ, a scanning speed is set to be 1 mm/s, and a scanning interval is set to be 26 μm;

(4) waterjet pressure intensity is adjusted to be 6 MPa; and (5) a scanning trace file is compiled according to scanning frequency and a scanning path, and processing programs are operated to perform processing of the micro-scale V-shaped groove array, where a depth of V-shaped grooves is 20-30 μm, and a width is 10-20 μm.

2) Femtosecond lasers are utilized for scanning to prepare a micro-nano dual-scale composite structure on a basis of the micro-scale V-shaped groove array, where the technology adopts femtosecond lasers with the wavelength being 800 nm, the femtosecond lasers are a Gaussian beam, a laser pulse width is 35 fs, pulse repetition frequency can be adjusted to maximum 1 kHz, and a scanning speed is 100 μm/s, (1) the monocrystalline silicon wafer is cleaned and installed on the workbench;

(2) laser pulse energy is set to be 0.1mJ, pulse repetition frequency is set to be 1 kHz, a scanning speed is set to be 100 μm/s, scanning time is 1, and a scanning path is set, where the scanning path is perpendicular to the direction of the V-shaped groove array; and (3) focus hight of the lasers is adjusted to the middle of V-shaped grooves in a height direction, and the processing programs are operated for scanning to obtain the texture.

Embodiment 3

As shown in FIG. 3, a method for preparing a monocrystalline silicon micro-nano dual-scale anti-reflection texture includes: 1) A micro-scale V-shaped groove array is processed through nanosecond-laser-assisted waterjet, where a technology adopts nanosecond lasers with a wavelength being 1064 nm, a laser pulse width being 200 ns, and repetition frequency being 100 kHz, (1) a monocrystalline silicon wafer is cleaned and installed on a nanosecond-laser-assisted waterjet workbench;

(2) focus hight of the lasers is adjusted to be −0.3 mm, a waterjet nozzle standoff distance is adjusted to be 0.3 mm, a waterjet impact angle is adjusted to be 45 degrees, and a waterjet offset distance is adjusted to be 0.7 mm;

(3) the laser pulse width is set to be 200 ns, pulse repetition frequency is set to be 100 kHz, laser pulse energy is set to be 0.15mJ, a scanning speed is set to be 3 mm/s, and a scanning interval is set to be 30 μm;

(4) waterjet pressure intensity is adjusted to be 8 MPa; and (5) a scanning trace file is compiled according to scanning frequency and a scanning path, and processing programs are operated to perform processing of the micro-scale V-shaped groove array, where a depth of V-shaped grooves is 20-30 μm, and a width is 30-40 μm.

2) Femtosecond lasers are utilized for scanning to prepare a micro-nano dual-scale composite structure on a basis of the micro-scale V-shaped groove array, where the technology adopts femtosecond lasers with the wavelength being 800 nm, the femtosecond lasers are a Gaussian beam, a laser pulse width is 35 fs, pulse repetition frequency can be adjusted to maximum 1 kHz, and a scanning speed is 200 μm/s, (1) the monocrystalline silicon wafer is cleaned and installed on the workbench;

(2) laser pulse energy is set to be 0.02 mJ, pulse repetition frequency is set to be 1 kHz, a scanning speed is set to be 200 μm/s, scanning time is 5, and a scanning path is set, where the scanning path is perpendicular to the direction of the V-shaped groove array; and (3) focus hight of the lasers is adjusted to the middle of V-shaped grooves in a height direction, and the processing programs are operated for scanning to obtain the texture.

The foregoing descriptions are merely preferred embodiments of the present disclosure, but are not intended to limit the present disclosure. A person skilled in the art may make various alterations and variations to the present disclosure. Any modification, equivalent replacement, or improvement made and the like within the spirit and principle of the present disclosure shall fall within the protection scope of the present disclosure.

What is claimed is:

1. A method for preparing a monocrystalline silicon micro-nano dual-scale anti-reflection texture, comprising:
a nanosecond-laser-assisted waterjet device is utilized for scanning in a longitudinal direction of a monocrystalline silicon wafer, and waterjet is arranged behind nanosecond lasers in a scanning speed direction to prepare a V-shaped groove array in the monocrystalline silicon wafer; and
nano structures different in size or density are processed in different positions of the V-shaped groove array by utilizing femtosecond lasers in different focus height for sequential scanning in a transverse direction perpendicular to the V-shaped groove array or forming a set angle with the V-shaped groove array, thereby obtaining the micro-nano dual-scale anti-reflection texture.

2. The method for preparing a monocrystalline silicon micro-nano dual-scale anti-reflection texture according to claim 1, wherein a pulse width of the nanosecond lasers is 10-350 ns, pulse repetition frequency is 20-1000 kHz, a scanning speed is 1-5 mm/s, and pressure intensity of waterjet is 5-20 MPa.

3. The method for preparing a monocrystalline silicon micro-nano dual-scale anti-reflection texture according to claim 2, wherein a wavelength of the nanosecond lasers is 1064 nm.

4. The method for preparing a monocrystalline silicon micro-nano dual-scale anti-reflection texture according to claim 1, wherein laser pulse energy is 0-0.6 mJ, focus height is −0.6-0.6 mm, a waterjet nozzle standoff distance is 0.2-1.2 mm, an offset distance of the waterjet is 0.1-0.8 mm, and a waterjet impact angle ranges from 30 degrees to 60 degrees.

5. The method for preparing a monocrystalline silicon micro-nano dual-scale anti-reflection texture according to claim 4, wherein laser pulse energy of the femtosecond lasers is 0-13 mJ, a scanning speed is 25-300 μm/s, and pulse repetition frequency is 1-1000 Hz.

6. The method for preparing a monocrystalline silicon micro-nano dual-scale anti-reflection texture according to claim 5, wherein a wavelength of the femtosecond lasers is 800 nm, and a laser pulse width is 35 fs.

7. The method for preparing a monocrystalline silicon micro-nano dual-scale anti-reflection texture according to claim 6, wherein the focal planes of the femtosecond lasers are positioned to middles of V-shaped grooves.

8. The method for preparing a monocrystalline silicon micro-nano dual-scale anti-reflection texture according to claim 1, wherein a depth of the V-shaped grooves is 20-40 μm, and a width is 20-40 μm.

9. The method for preparing a monocrystalline silicon micro-nano dual-scale anti-reflection texture according to claim 1, the nano structure consisting of at least one member selected from a fine ripple periodic structure, a coarse ripple periodic structure and a nano particle.

10. A monocrystalline silicon micro-nano dual-scale anti-reflection texture, prepared by the preparation method according to claim 1.

* * * * *